United States Patent
Kim et al.

(10) Patent No.: US 12,422,661 B2
(45) Date of Patent: Sep. 23, 2025

(54) PHOTOGRAPHING APPARATUS AND PHOTOGRAPHING METHOD

(71) Applicants: POSTECH RESEARCH AND BUSINESS DEVELOPMENT FOUNDATION, Pohang-si (KR); SEOUL NATIONAL UNIVERSITY HOSPITAL, Seoul (KR)

(72) Inventors: Ki Hean Kim, Pohang-si (KR); Chang Ho Yoon, Seoul (KR); Jungbin Lee, Pohang-si (KR); Soohyun Park, Pohang-si (KR); Seonghan Kim, Seoul (KR); Kyungbin Bae, Seoul (KR)

(73) Assignees: POSTECH Research and Business Development Foundation, Pohang-si (KR); SEOUL NATIONAL UNIVERSITY HOSPITAL, Seoul (KR)

( * ) Notice: Subject to any disclaimer, the term of this patent is extended or adjusted under 35 U.S.C. 154(b) by 123 days.

(21) Appl. No.: 18/532,542

(22) Filed: Dec. 7, 2023

(65) Prior Publication Data

US 2024/0255747 A1    Aug. 1, 2024

(30) Foreign Application Priority Data

Jan. 27, 2023  (KR) .................. 10-2023-0011108
Sep. 14, 2023  (KR) .................. 10-2023-0122615

(51) Int. Cl.
G02B 21/36    (2006.01)
G02B 21/06    (2006.01)

(52) U.S. Cl.
CPC ........... *G02B 21/367* (2013.01); *G02B 21/06* (2013.01)

(58) Field of Classification Search
CPC .................... G02B 21/367; G02B 21/06
See application file for complete search history.

(56) References Cited

U.S. PATENT DOCUMENTS

| | | | |
|---|---|---|---|
| 6,709,108 B2 | 3/2004 | Levine et al. | |
| 7,331,669 B2 | 2/2008 | Elsner | |

(Continued)

FOREIGN PATENT DOCUMENTS

| | | |
|---|---|---|
| EP | 2 635 186 B1 | 5/2017 |
| EP | 3 360 463 B1 | 1/2019 |

(Continued)

OTHER PUBLICATIONS

Qi-Hua Le, "An in Vivo Confocal Microscopy and Impression Cytology Analysis of Goblet Cells in Patients with Chemical Burns", IOVS, Mar. 2010, pp. 1397-1400, vol. 51, No. 3.

(Continued)

*Primary Examiner* — Fernando Alcon
(74) *Attorney, Agent, or Firm* — Sughrue Mion, PLLC

(57) ABSTRACT

Provided is a photographing apparatus including an image capturing unit including a first light source, an object lens, and a first light detector, a surface detecting unit including a second light source, the object lens, and a second light detector, a processor configured to obtain a strong reflection signal area where a reflection signal is strong in an oblique plane image obtained from the second light detector, and obtain a relative position relationship between a region of interest and a focal plane of the object lens, and an actuator configured to adjust the region of interest to be in focus.

18 Claims, 18 Drawing Sheets

(56) References Cited

U.S. PATENT DOCUMENTS

| | | | |
|---|---|---|---|
| 7,665,844 B2 | 2/2010 | Chen et al. | |
| 10,123,697 B2 | 11/2018 | Rossi | |
| 2015/0042954 A1 | 2/2015 | Hunter et al. | |
| 2017/0276924 A1* | 9/2017 | Chan | G02B 21/34 |
| 2019/0302028 A1 | 10/2019 | Sommera et al. | |
| 2021/0318530 A1* | 10/2021 | Deissler | G02B 21/0068 |
| 2022/0175241 A1 | 6/2022 | Tripathi | |
| 2022/0260818 A1 | 8/2022 | Millett-Sikking et al. | |
| 2022/0326498 A1* | 10/2022 | Oreopoulos | G02B 6/0006 |
| 2022/0390730 A1* | 12/2022 | Schumann | G02B 21/16 |
| 2023/0035107 A1* | 2/2023 | Schumann | G02B 21/0032 |
| 2023/0104545 A1* | 4/2023 | Fahrbach | G02B 21/02 359/385 |
| 2024/0045195 A1* | 2/2024 | Dunsby | G02B 21/006 |
| 2024/0111141 A1* | 4/2024 | Hollinger | G02B 21/0036 |

FOREIGN PATENT DOCUMENTS

| | | | | |
|---|---|---|---|---|
| EP | 3893039 A1 * | 10/2021 | | G02B 27/283 |
| EP | 3 945 358 A1 | 2/2022 | | |
| JP | 2814050 B2 | 10/1998 | | |
| WO | 2021/058939 A1 | 4/2021 | | |
| WO | 2022/123346 A1 | 6/2022 | | |
| WO | 2022/132889 A1 | 6/2022 | | |
| WO | WO-2024020655 A1 * | 2/2024 | | G02B 21/367 |

OTHER PUBLICATIONS

Seonghan Kim, et al., "In vivo fluorescence imaging of conjunctival goblet cells", Scientific Reports, 2019, pp. 1-7, vol. 9, No. 1.

Jungbin Lee, et al., "Moxifloxacin based axially swept wide-field fluorescence microscopy for high-speed imaging of conjunctival goblet cells", Biomedical Optics Express, Sep. 1, 2020, , pp. 4890-4900, vol. 11, No. 9.

Jungbin Lee, et al., "Moxifloxacin-Based Extended Depth-of-Field Fluorescence Microscopy for Real-Time Conjunctival Goblet Cell Examination", IEEE Transactions on Medical Imaging, Aug. 2022, pp. 2004-2008, vol. 41, No. 8.

L. Silvestri, et al., "Universal autofocus for quantitative volumetric microscopy of whole mouse brains", Nature Methods, 2021, pp. 953-958, vol. 18, No. 8.

Zichao Bian, et al., "Autofocusing technologies for whole slide imaging and automated microscopy", Review Article, J. Biophotonics, 2020, pp. 1-21.

S. Kim, et al., "Non-invasive high-contrast imaging of conjunctival goblet cells for the precision diagnosis of ocular surface diseases", The Ocular Surface, 2022, pp. 100-102, vol. 24.

* cited by examiner

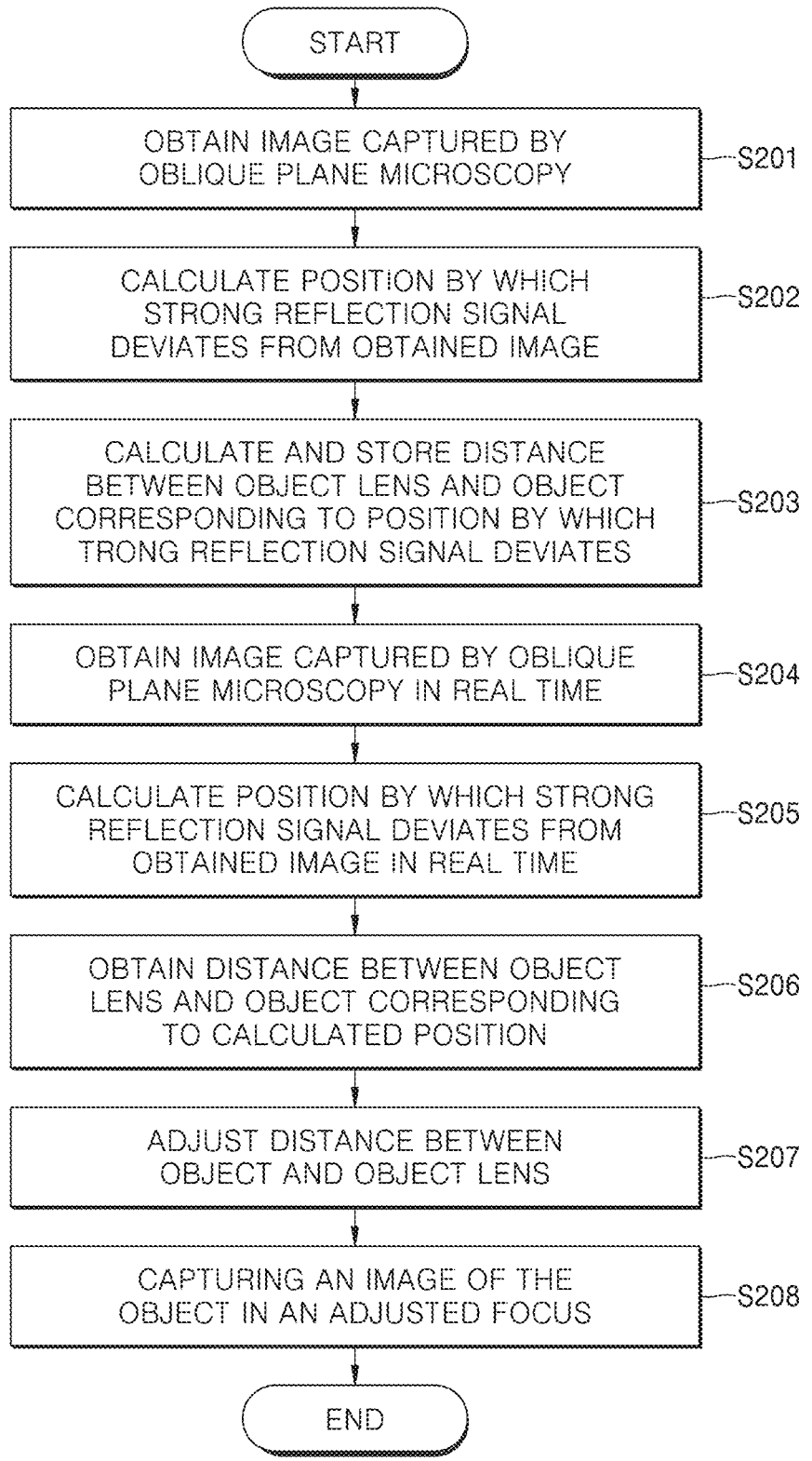

PHOTOGRAPHING APPARATUS AND PHOTOGRAPHING METHOD

CROSS-REFERENCE TO RELATED APPLICATION

This application is based on and claims priority under 35 U.S.C. § 119 to Korean Patent Application No. 10-2023-0011108, filed on Jan. 27, 2023, and Korean Patent Application No. 10-2023-0122615, filed on Sep. 14, 2023, in the Korean Intellectual Property Office, the disclosures of which are incorporated by reference herein in their entireties.

BACKGROUND

1. Field

The disclosure relates to a photographing apparatus and a photographing method, and more particularly, to a photographing apparatus including a surface detecting unit using oblique plane microscopy.

This study has been conducted with the support of Samsung Science & Technology Foundation (Project Number: SRFC-IT2101-05).

2. Description of the Related Art

Microscopes may enlarge, to a certain magnification, a certain area of an object that is not visually identifiable to the naked eyes and obtain an enlarged image. The obtained image may be used to identify or examine a state of the object.

Microscopes that provide a high-resolution image have a shallow depth of focus, and thus, out-of-focus may easily occur in non-contact imaging. In this regard, high-depth of focus microscopy is required.

In addition, when several areas are photographed by moving a photographing area for a large-area microscopic examination, a distance between a microscope and a surface of an object having many curves changes, and thus, an area may be outside a depth of focus of the microscope. Accordingly, a photographing apparatus and a photographing method for detecting a surface of an object having many curves and re-focusing to capture an image are required.

SUMMARY

Provided are a photographing apparatus and a photographing method, which capture an image in focus by detecting and tracking a surface of an object by using an oblique plane image captured by a microscope.

Additional aspects will be set forth in part in the description which follows and, in part, will be apparent from the description, or may be learned by practice of the presented embodiments of the disclosure.

According to an aspect of the disclosure, a photographing apparatus includes an image capturing unit including a first light source, an object lens, and a first light detector, and configured such that first light irradiated by the first light source is reflected by an object or realizes fluorescent light through excitation, the first light detector receives the fluorescent light or the first light reflected by the object and captures an image including a region of interest of the object, a surface detecting unit including a second light source, the object lens, and a second light detector, and configured such that second light irradiated by the second light source is incident on a surface of the object at an angle with an optical axis of the object lens, the second light detector receives the second light reflected by the surface of the object and captures an oblique plane image, a processor configured to obtain a strong reflection signal area where a reflection signal is strong in the oblique plane image obtained from the second light detector, and obtain a relative position relationship between the region of interest and a focal plane of the object lens, and an actuator configured to adjust the region of interest to be in focus.

The processor may be further configured to obtain a number of pixels between the strong reflection signal area and an in-image region of interest corresponding area in the oblique plane image obtained from the second light detector.

The processor may be further configured to obtain the relative position relationship between the region of interest and the focal plane of the object lens by using a number of pixels in a first direction between the strong reflection signal area and an in-image region of interest corresponding area in the oblique plane image obtained from the second light detector.

The processor may be further configured to obtain the relative position relationship between the region of interest and the focal plane of the object lens by using a number of pixels in a first direction between the strong reflection signal area and an in-image region of interest corresponding area in the oblique plane image obtained from the second light detector, and a total number of pixels in the first direction of the oblique plane image.

The processor may be further configured to obtain the relative position relationship between the region of interest and the focal plane of the object lens by using at least one of a number of pixels in a first direction between the strong reflection signal area and an in-image region of interest corresponding area in the oblique plane image obtained from the second light detector, a total number of pixels in the first direction of the oblique plane image, an angle of view of the object lens, and an angle formed by the first light source incident on the object and the optical axis of the object lens.

A wavelength band of the first light and a wavelength band of the second light may be different from each other.

The first light source may include a light-emitting diode (LED) light source and the second light source may include a laser diode (LD) light source.

A wavelength band of the first light may be about 300 nm to about 450 nm, and a wavelength band of the second light may be about 600 nm to about 800 nm.

The image capturing unit may further include an exciter filter arranged on an optical path of the first light and selectively transmitting light in a wavelength band exciting a fluorescent material of the object.

The image capturing unit may further include an emission filter arranged on an optical path of the first light and selectively transmitting light in a wavelength band emitted by a fluorescent material of the object.

The surface detecting unit may further include an emission filter arranged on an optical path of the second light and selectively transmitting light in a wavelength band emitted by a fluorescent material of the object.

The image capturing unit may further include a variable lens arranged on an optical path and adjusting a focal position of the object lens.

The variable lens may include an electrically tunable lens.

According to another aspect of the disclosure, a photographing method includes capturing, by an image capturing unit including a first light source, an object lens, and a first light detector, an image including a region of interest of an object, obtaining, by a surface detecting unit including a second light source, a second light detector, and the object lens, an oblique plane image, obtaining a strong reflection signal area where a reflection signal is strong in the oblique plane image, and obtaining a relative position relationship between the region of interest and a focal plane of the object lens, adjusting the region of interest to be in focus, and capturing an image of the object in an adjusted focus.

The obtaining of the relative position relationship between the region of interest and the focal plane includes obtaining the relative position relationship between the region of interest and the focal plane of the object lens by using at least one of a number of pixels in a first direction between the strong reflection signal area and an in-image region of interest corresponding area in the oblique plane image obtained from the second light detector, a total number of pixels in the first direction of the oblique plane image, an angle of view of the object lens, and an angle formed by the first light source incident on the object and the optical axis of the object lens.

A wavelength band of first light irradiated from the first light source and a wavelength band of second light irradiated from the second light source may be different from each other.

A wavelength band of first light irradiated from the first light source may be about 300 nm to about 450 nm, and a wavelength band of second light irradiated from the second light source may be about 600 nm to about 800 nm.

The adjusting of the region of interest to be in focus may include, when the relative position relationship between the region of interest and the focal plane of the object lens is a pre-determined reference value or more, adjusting, by an actuator, the region of interest to be in focus, and when the relative position relationship between the region of interest and the focal plane of the object lens is less than the pre-determined reference value, adjusting, by a variable lens, the region of interest to be in focus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 is a flowchart schematically illustrating another embodiment of a photographing method.

DETAILED DESCRIPTION

Figure 1:
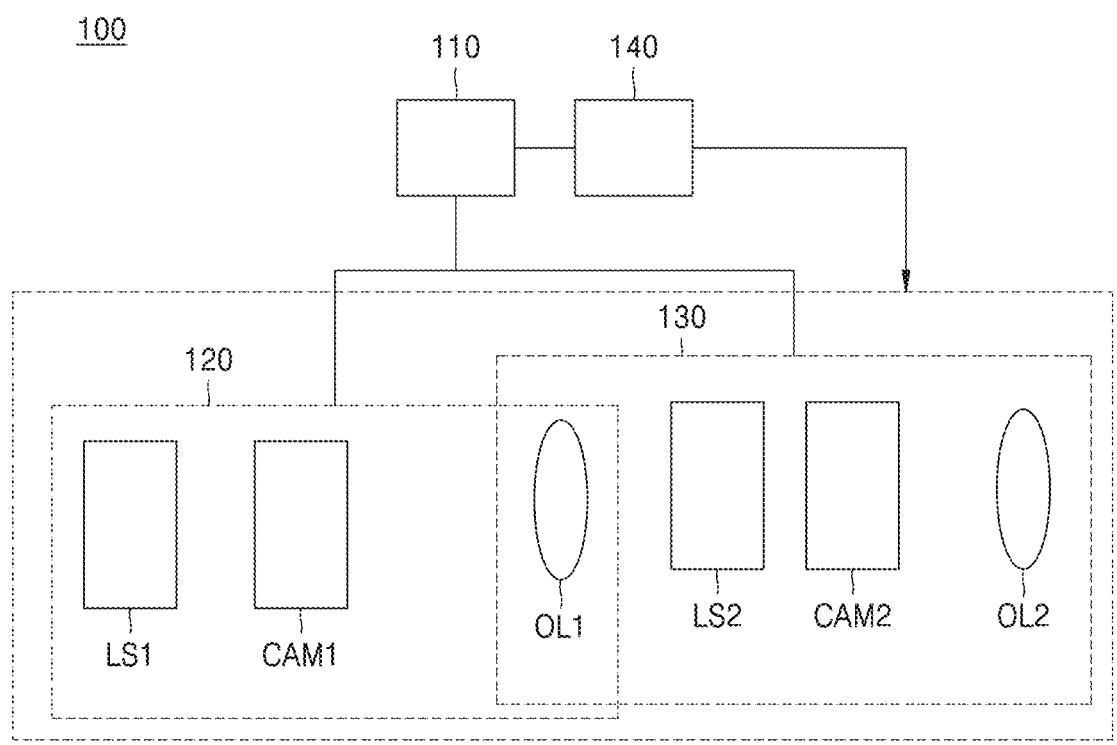
FIG. 1 is a diagram schematically illustrating an embodiment of a photographing apparatus.

Hereinafter, embodiments of a photographing apparatus including a surface detecting unit will be described in detail with reference to accompanying drawings. In the drawings, like reference numerals denote like elements and the sizes or thicknesses the elements may be exaggerated for clarity of description. Expressions such as "at least one of," when preceding a list of elements, modify the entire list of elements and do not modify the individual elements of the list.

The disclosure relates to a photographing apparatus including a surface detecting unit, and photographing method, the photographing apparatus for adjusting focus by tracking a surface of an object, and the photographing apparatus including the surface detecting unit, and the photographing method, according to the disclosure will be described with reference to FIGS. 1 to 15.

FIG. 1 is a diagram illustrating an embodiment of a photographing apparatus 100.

Referring to FIG. 1, the photographing apparatus 100 may include a processor 110, an image capturing unit 120, a surface detecting unit 130, and an actuator 140 The image capturing unit 120 may include a first light source LS1, a first light detector CAM1, and a first object lens OL1. The surface detecting unit 130 may include a second light source LS2, a second light detector CAM2, the first object lens OL1, and a second object lens OL2. Here, the photographing apparatus 100 may be a microscope.

The processor 110 may denote a central processing unit (CPU), a graphics processing unit (GPU), or a dedicated processor performing methods according to embodiments of the disclosure. The processor 110 may calculate a position of a strong reflection signal and obtain a distance between an object and an object lens, according to a method described below with reference to FIGS. 12 to 15.

According to an embodiment, the processor 110 may obtain, in real time, a distance between an object and the first object lens OL1 by using a position of reflection light in an image. The processor 110 may obtain the distance between the object and the first object lens OL1 according to each time by using the position of the reflection light in the image according to each time. The processor 110 may track a surface of the object by obtaining the distance between the object and the first object lens OL1 according to each time.

The photographing apparatus 100 may further include a memory. The memory may be configured as at least one of a volatile storage medium and a non-volatile storage medium. For example, the memory may be configured as at least one of a read-only memory and a random access memory. The processor 110 may execute a program command stored in the memory.

According to another embodiment, the processor 110 may obtain the distance between the object and the first object lens OL1 by using the position of the strong reflection signal in the image, at a certain time interval. The processor 110 may obtain the distance between the object and the first object lens OL1 for each certain time by using the position of the strong reflection signal in the image according to the certain time interval. Also, the processor 110 may obtain the distance between the object and the first object lens OL1 for each time by interpolating the position of the strong reflection signal in the image according to certain time interval. The processor 110 may track the surface of the object by using the distance between the object and the first object lens OL1, which is obtained through interpolation.

The first light detector CAM1 and the second light detector CAM2 may each include an image sensor. The first light detector CAM1 and the second light detector CAM2 may each detect light and convert the same into an electric signal.

The actuator 140 may include a motor. The actuator 140 may adjust a distance between the photographing apparatus 100 and the object. The actuator 140 may adjust the distance between the first object lens OL1 and the object. The actuator 140 may adjust a focal plane of the first object lens OL1 of the photographing apparatus 100 such that the position of the strong reflection signal, obtained by the processor 110, is a pre-determined value or less. The actuator 140 may adjust the distance between the photographing apparatus 100 and the object by, for example, about 1 mm.

In FIG. 1, the image capturing unit 120 and the surface detecting unit 130 are illustrated as respective components, but the image capturing unit 120 and the surface detecting unit 130 may configure one photographing apparatus. Alternatively, in FIG. 1, one processor 110 is illustrated, but the image capturing unit 120 and the surface detecting unit 130 may each include a separate processor. The image capturing unit 120 and the surface detecting unit 130 will be described in detail below with reference to FIGS. 2 to 3D.

Figure 2:
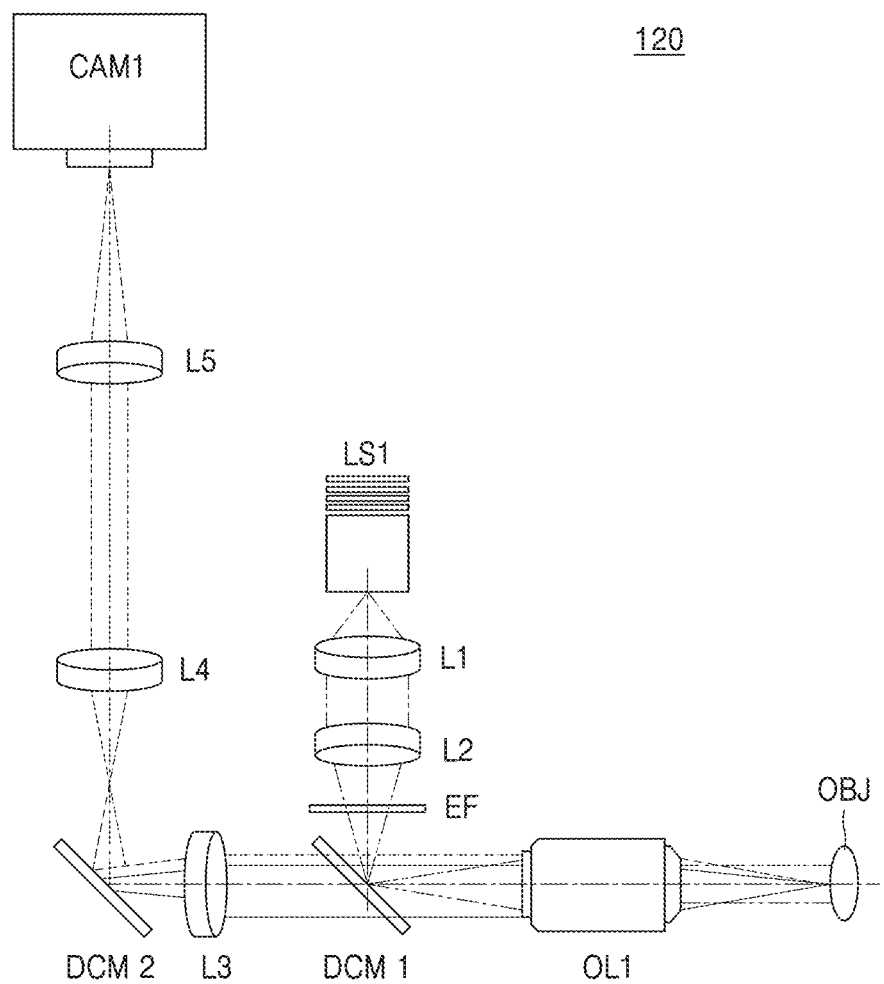
FIG. 2 is a diagram illustrating an embodiment of components of an image capturing unit of FIG. 1.

FIG. 2 is a diagram illustrating an embodiment of the image capturing unit 120 of FIG. 1.

Referring to FIG. 2, the image capturing unit 120 may include the first light source LS1, the first light detector CAM1, and the first object lens OL1. The image capturing unit 120 may further include first to fifth lenses L1 to L5. At least one of the first to fifth lenses L1 to L5 may be configured as a tube lens.

The image capturing unit 120 may further include first and second dichroic mirrors DCM1 and DCM2.

The image capturing unit 120 may capture a high depth of focus image of an object OBJ. The image capturing unit 120 may capture an extended depth of focus (EDoF) image. The image capturing unit 120 may configure an EDoF optical system.

The first light source LS1 may output light (e.g., single photon), and may be a light-emitting diode (LED) light source. A wavelength range of the first light source LS1 may be, for example, about 365 nm to about 405 nm (UVA-short visible). Light of the first light source LS1 may be reflected towards the first object lens OL1 by the first dichroic mirror DCM1 through the first and second lenses L1 and L2. The light reflected by the first dichroic mirror DCM1 may be irradiated on the object OBJ through the first object lens OL1. The object OBJ may be focused by the first object lens OL1. The light irradiated on the object OBJ may be reflected by a surface of the object OBJ or realize fluorescent light through excitation, pass through the first object lens OL1 and the first dichroic mirror DCM1 again, and then be reflected towards the first light detector CAM1 by the second dichroic mirror DCM2 through the third lens L3. The light reflected by the second dichroic mirror DCM2 may be input to the first light detector CAM1 through the fourth and fifth lenses L4 and L5. The first light detector CAM1 may photograph the object OBJ by the light irradiated from the first light source LS1. Here, the first and second dichroic mirrors DCM1 and DCM2 may be replaced by a beam splitter BS.

Figure 3A:
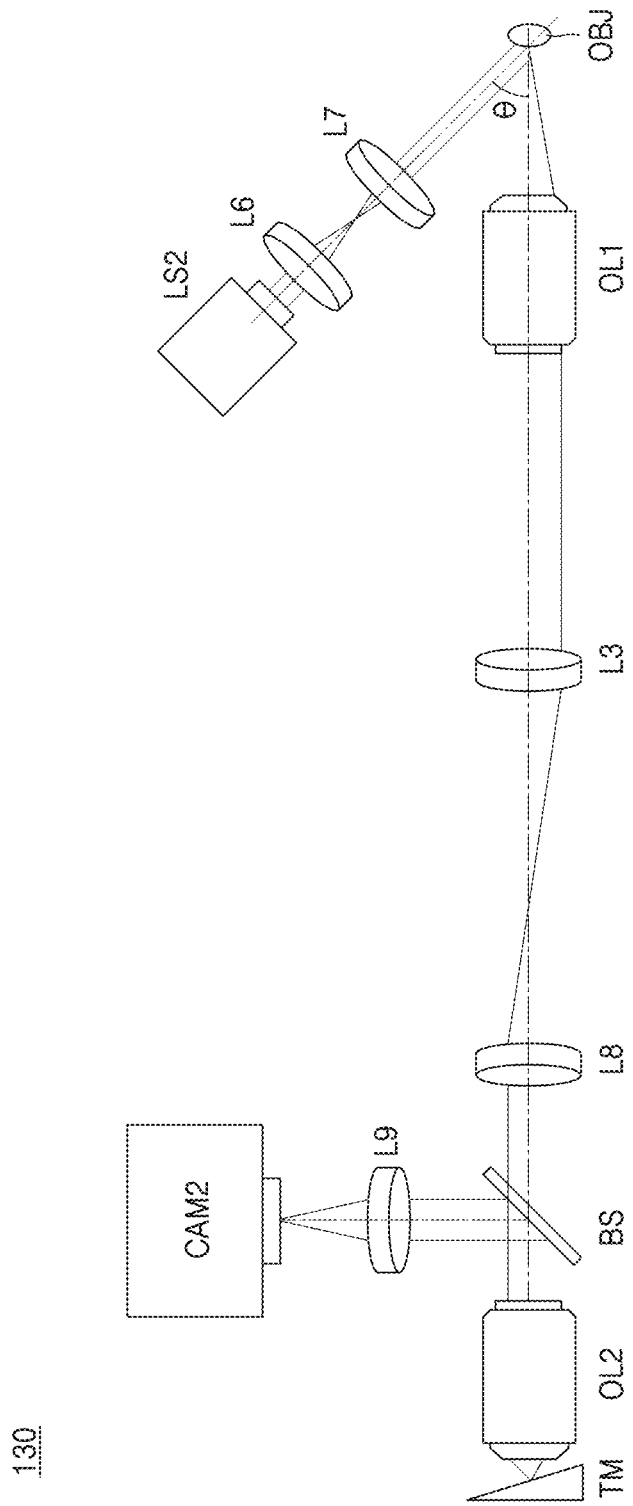
FIG. 3A is a diagram illustrating an embodiment of components of a surface detecting unit of FIG. 1.
Figure 3B:
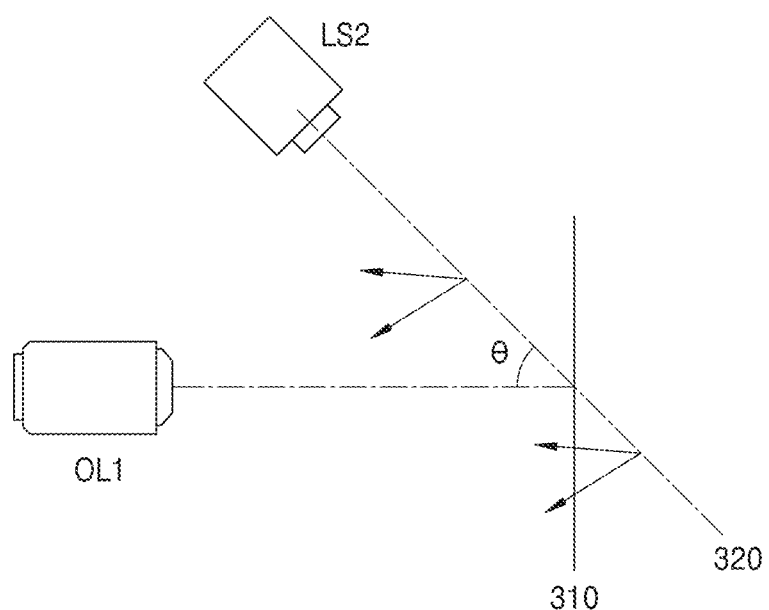
FIG. 3B is a diagram showing paths of beams originated from two points on an oblique plane.
Figure 3C:
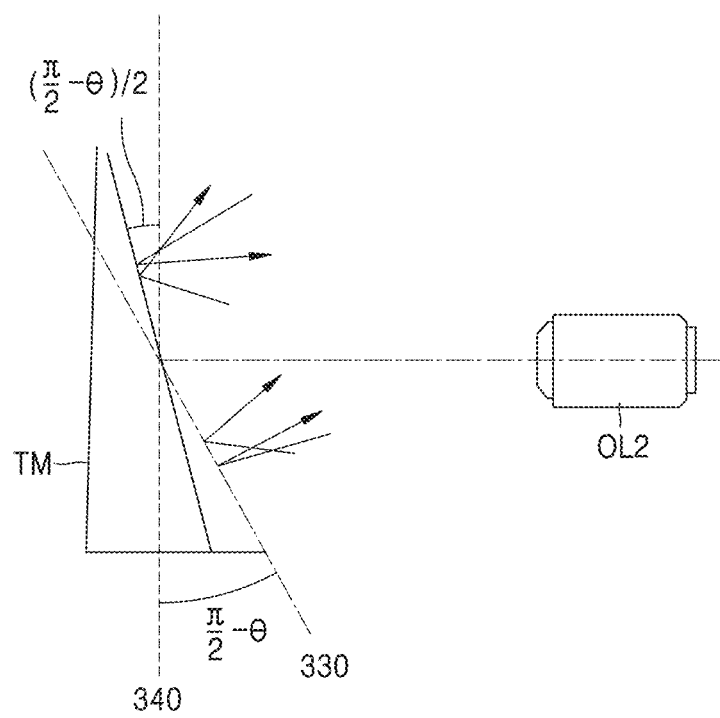
FIG. 3C is a diagram showing paths of two beams reflected by a tilted mirror.
Figure 3D:
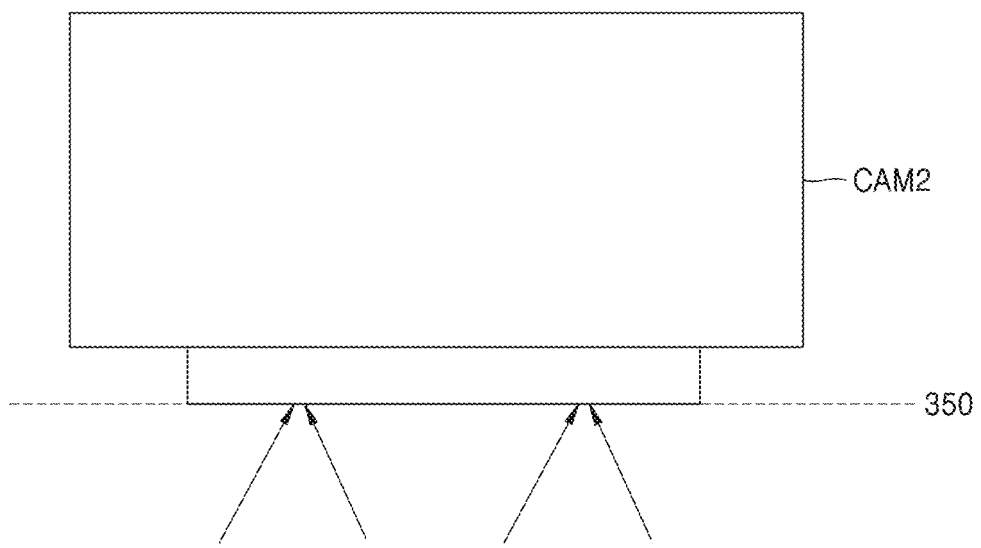
FIG. 3D is a diagram showing paths of two beams incident on a second light detector.

FIG. 3A is a diagram illustrating an embodiment of the surface detecting unit 130 of FIG. 1, FIG. 3B is a diagram showing paths of beams originated from two points on an oblique plane, FIG. 3C is a diagram showing paths of two beams reflected by a tilted mirror TM, and FIG. 3D is a diagram showing paths of two beams incident on the second light detector CAM2.

Referring to FIG. 3A, the surface detecting unit 130 may include the second light source LS2, the second light detector CAM2, the first object lens OL1, and the second object lens OL2. The surface detecting unit 130 may further include the third lens L3 and sixth to ninth lenses L6 to L9. At least one of the sixth to ninth lenses L6 to L9 may be configured as a tube lens. The surface detecting unit 130 may further include the beam splitter BS. The first object lens OL1 and the third lens L3 may be commonly provided for the image capturing unit 120 and the surface detecting unit 130.

The surface detecting unit 130 may capture an oblique plane image. The surface detecting unit 130 may configure an oblique plane microscopy (OPM).

The second light source LS2 may output light and may be a laser diode (LD) light source. A wavelength range of the second light source LS2 may be configured to be different from the wavelength range of the first light source LS1. For example, the second light source LS2 may be configured to output light of about 600 nm to about 800 nm, and the first light source LS1 may be configured to output light of about 300 nm to about 450 nm. The sixth lens L6 and the seventh lens L7 may be configured as a pair to adjust an irradiating position of light irradiated from the second light source LS2 to a focal position of the first object lens OL1. The light of the second light source LS2 may be incident obliquely on the object OBJ through the sixth lens L6 and the seventh lens L7.

Referring to FIG. 3B together, an angle θ formed by an optical axis of the second light source LS2 and an optical axis of the first object lens OL1 may be greater than 0 and oblique. Direction lines shown in FIG. 3B illustrate beams originating from two arbitrary points on an oblique plane 320.

The light of the second light source LS2 may be reflected by the object OBJ and the light reflected by the object OBJ may pass through focus between the third lens L3 and the eighth lens L8 through the first object lens OL1 and the third lens L3. The light that passed through the focus between the third lens L3 and the eighth lens L8 may pass through the eighth lens L8 and the beam splitter BS, and the light that passed through the beam splitter BS may focus on a conjugate point on one surface of the tilted mirror TM by the second object lens OL2. An oblique image may be formed on a conjugate plane 330 of the tilted mirror TM, which is in a conjugate relationship with the oblique plane 320. An inclination of an oblique image plane obtained by photographing the object OBJ may be adjusted according to a magnification of the pair of the third lens L3 and the eighth lens L8.

Referring to FIG. 3C together, the light that passed through the second object lens OL2 may be reflected by the tilted mirror TM. The oblique image may be reflected by the tilted mirror TM and rotate in parallel with a focal plane 340 of the second object lens OL2. An optical axis of the second object lens OL2 may be identical to an optical axis of the first object lens OL1. The focal plane 340 of the second object lens OL2 may be parallel to a focal plane of the first object lens OL1.

An inclination of an image may be adjusted according to an inclination of the tilted mirror TM. For example, an inclination of one surface of the tilted mirror TM may be configured such that the inclination of the image is parallel to the focal plane 340 of the second object lens OL2. Here, an angle formed by the conjugate plane 330 and the optical axis of the second object lens OL2 may be θ, and an angle formed by the conjugate plane 330 and the focal plane 340 of the second object lens OL2 may be π/2−θ. In this case, the one surface of the tilted mirror TM may be configured to be inclined from the focal plane 340 of the second object lens OL2 by a half of the angle (π/2−θ) formed by the conjugate plane 330 and a surface perpendicular to the optical axis of the second object lens OL2.

Figure 4:
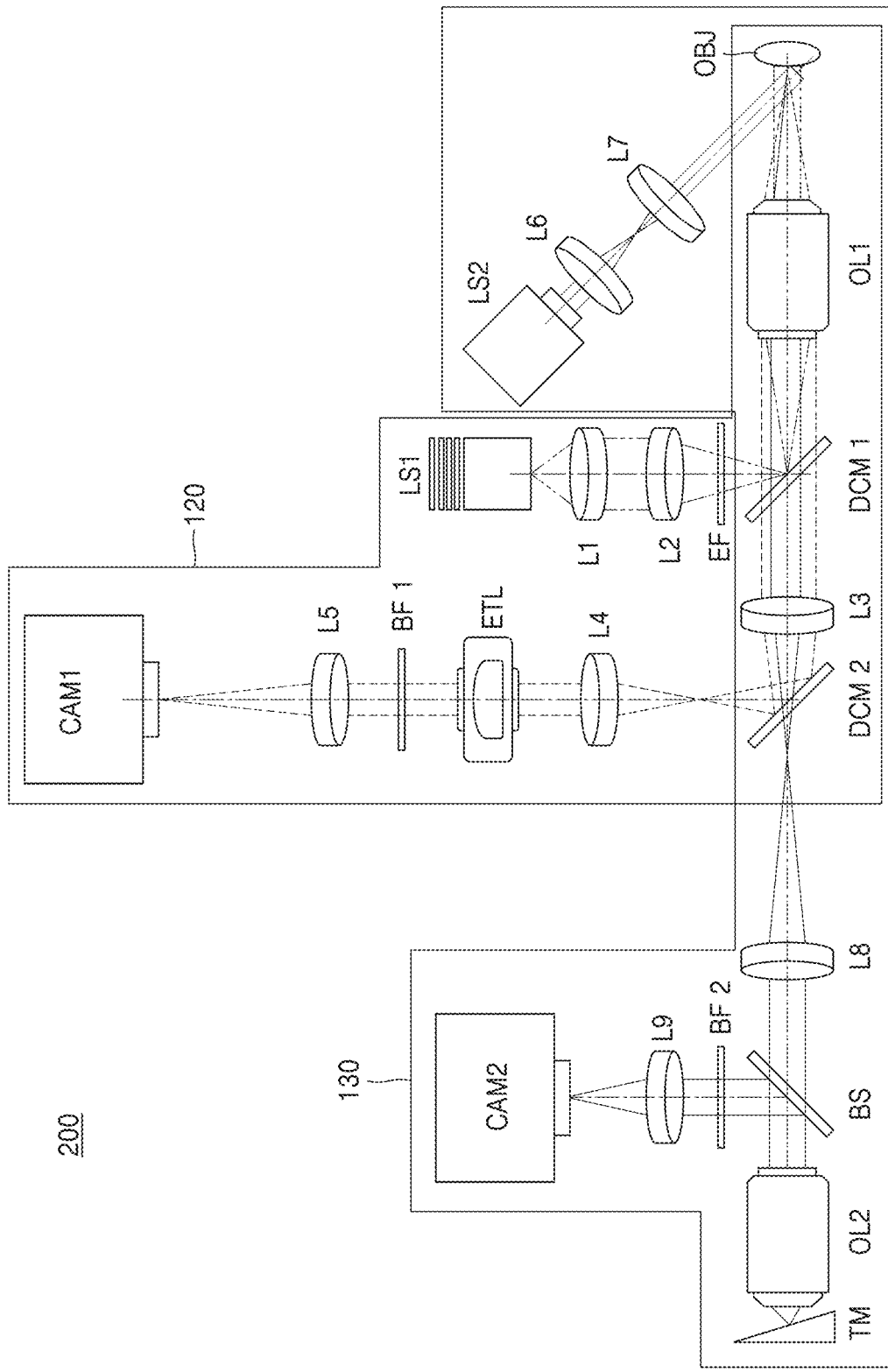
FIG. 4 is a diagram illustrating another embodiment of a photographing apparatus.

Referring back to FIG. 3A, the light reflected by the tilted mirror TM may pass through the second object lens OL2 again. The light that passed through the second object lens OL2 may be reflected by the beam splitter BS and the light reflected by the beam splitter BS may be incident on the second light detector CAM2 through the ninth lens L9. An optical axis of the light reflected by the beam splitter BS may be incident perpendicular to an imaging plane 350 of the second light detector CAM2. Accordingly, the processor 110 of FIG. 1 may obtain an image of an area positioned in the oblique plane 320 of the FIG. 3B among surfaces of the object OBJ. FIG. 4 is a diagram illustrating another embodiment of a photographing apparatus 200.

Referring to FIG. 4, the photographing apparatus 200 may include the image capturing unit 120 of FIG. 2 and the surface detecting unit 130 of FIG. 3A together. The image capturing unit 120 and the surface detecting unit 130 have been described above, and thus differences between FIGS. 2 and 3A will be mainly described.

The photographing apparatus 200 may further include an exciter filter EF. The exciter filter EF may selectively transmit light in a wavelength band exciting a fluorescent material. The exciter filter EF may be provided between the first dichroic mirror DCM1 and the second lens L2. Alternatively, the exciter filter EF may be provided on an optical path between the first lens L2 and the second lens L2.

The photographing apparatus 200 may further include a plurality of emission filters BF1 and BF2. The emission filters BF1 and BF2 may selectively transmit light in a wavelength band emitted by the fluorescent material. The emission filter BF1 may be provided on an optical path between the fourth lens L4 and the fifth lens L5. Also, the emission filter BF2 may be provided on an optical path between the beam splitter BS and the ninth lens L9.

The photographing apparatus 200 may further include a variable lens (e.g., an electrically tunable lens) ETL. The variable lens ETL may adjust a focal position on the object OBJ by adjusting a focus degree, by using used together with the first object lens OL1. The variable lens ETL may be provided on the optical path between the fourth lens L4 and the fifth lens L5. Alternatively, when the emission filter BF1 is provided on the optical path between the fourth lens L4 and the fifth lens L5, the variable lens ETL may be provided on an optical path between the fourth lens L4 and the emission filter BF1. When used together with the first object lens OL1, the variable lens ETL may change the focal position on the object OBJ such that information focused on the entire area of the object OBJ is obtained while the first light detector CAM1 photographs the object OBJ.

The variable lens ETL may change a shape of a lens by using liquid that forms a convex or concave shape when a certain current flows through. In this case, the variable lens ETL is continuously changed from a convex lens shape to a concave lens shape by continuously flowing a current to the variable lens ETL to change the shape of the variable lens ETL, based on a neutral state of the variable lens ETL, i.e., a plane state, thereby changing the focal plane of the object OBJ photographed by the first light detector CAM1. Here, the variable lens ETL may be selectively configured as one of, for example, a liquid crystal tunable lens that changes a focal plane as an optical characteristic changes according to an applied electric field, a lens that changes a focal plane by using a meniscus of immiscible fluid (e.g., an electrically or electro-mechanically shaped meniscus lens), a lens in which encapsulated fluid is connected to a piston and a focal plane is changed by changing a shape of fluid by applying external pressure to a capsule by using the piston (e.g., an electro-mechanically shaped encapsulated-fluid lens), a lens that changes a focal plane by changing a shape of fluid by using an external pump, an electromagnetic actuator, a dielectric elastomer, an electrostrictive polymer actuator, or a piezoelectric actuator, or by using a zipper effect and thermal expansion of the fluid (e.g., hydraulically shaped lens), an elastomer lens including physical vapor deposition (PVD) gel (e.g., an electrically deformed elastomeric lens), and a lens that changes a focal plane by changing a shape of fluid by operating an external motor or by using static electricity, piezoelectricity, or polyethylene (PE) membrane (e.g., an electro-mechanically shaped elastomeric lens). In addition, the variable lens ETL having various shapes may be provided for the first light detector CAM1 to photograph a region of interest of the object OBJ at a high depth of focus.

As another example, the variable lens ETL of FIG. 4 may be replaced by a deformable mirror. The deformable mirror may include tens of actuators attached on a surface of a thin and bendable mirror for each area, and adjust several portions of the surface of the mirror to have different heights for each area by individually driving the actuators. A focal plane may be changed as a shape of the deformable mirror changes to a convex lens shape or a concave lens shape by the actuators.

Figure 5:
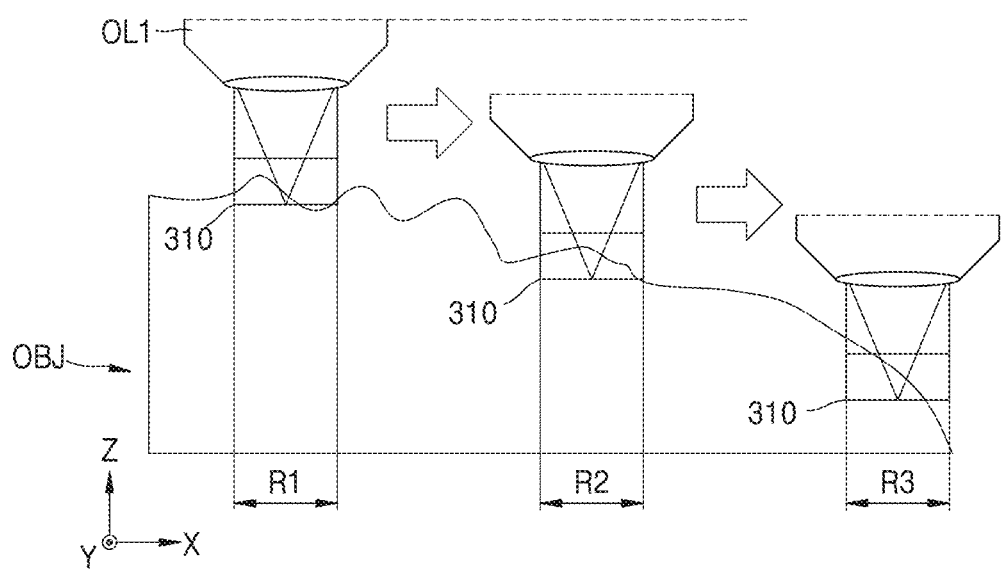
FIG. 5 is a diagram conceptually illustrating an embodiment of an image obtaining method of a photographing apparatus.

FIG. 5 is a diagram conceptually illustrating an embodiment of an image obtaining method of the photographing apparatus 100 or 200. Components that are the same as those in FIGS. 1 and 4 are indicated by same reference numerals.

Referring to FIG. 5, a focal plane 310 of the first object lens OL1 may be parallel to a plane formed by a first direction (X-axis) and a second direction (Y-axis), and a distance between the first object lens OL1 and a surface of the object OBJ may vary for each of first to third areas R1 to R3 due to different heights of the surface of the object OBJ in a third direction (Z-axis).

In the photographing apparatus 100 or 200, the focal plane 310 rapidly changes in the third direction (Z-axis) by the variable lens ETL or the deformable mirror, and thus the first light detector CAM1 may obtain an image of a high depth of focus imaging range in the first area R1 of the object OBJ.

Meanwhile, when the photographing apparatus 100 or 200 moves in the first direction (X-axis) to photograph the second area R2 after photographing the first area R1 of the object OBJ, the distance between the first object lens OL1 and the surface of the object OBJ may be changed. When the surface of the object OBJ has many curves, a focused image of the object OBJ may be unable to be obtained even when the photographing apparatus 100 or 200 performs photographing in the high depth of focus imaging range.

Accordingly, the image capturing unit 120 may capture the image of the object OBJ and at the same time, the surface detecting unit 130 may calculate the distance between the object OBJ and the first object lens OL1 by detecting the surface of the object OBJ. The photographing apparatus 100 or 200 may adjust a height of the photographing apparatus 100 or 200 in the third direction (Z-axis), based on the distance between the object OBJ and the first object lens OL1. The photographing apparatus 100 or 200 may adjust the focal plane 310 of the first object lens OL1 by adjusting the height in the third direction (Z-axis). The photographing apparatus 100 or 200 may capture a high depth of focus image of the second area R2 at the adjusted height.

After capturing the high depth of focus image of the second area R2 at the adjusted height, the photographing apparatus 100 or 200 may move in the first direction (X-axis) to photograph the third area R3. In this case as well, the photographing apparatus 100 or 200 may adjust the height of the photographing apparatus 100 or 200 in the third direction (Z-axis), based on the distance between the object OBJ and the first object lens OL1. The photographing apparatus 100 or 200 may adjust the focal plane 310 of the first object lens OL1 by adjusting the height in the third direction (Z-axis). The photographing apparatus 100 or 200 may capture a high depth of focus image of the third area R3 at the adjusted height.

Here, when a relative position relationship between the focal plane 310 of the first object lens OL1 and the region of interest of the object OBJ is a pre-determined reference value or more, the actuator 140 of FIG. 1 may adjust the region of interest to be in focus. When the relative position relationship between the focal plane 310 of the first object lens OL1 and the region of interest of the object OBJ is less than the pre-determined reference value, the variable lens ETL of FIG. 4 may adjust the region of interest to be in focus.

Hereinafter, a method by which the processor 110 calculates the distance between the object OBJ and the first object lens OL1 by using the oblique plane image captured by the surface detecting unit 130 will be described.

The processor 110 may identify a position of the strong reflection signal area in the image of the oblique plane 320 captured by the second light detector CAM2. The position of the strong reflection signal area in the image of the oblique plane 320 may be identified by the processor 110 using, for example, strength of a signal in the image of the oblique plane 320 captured by the second light detector CAM2. The processor 110 may obtain the distance between the object OBJ and the first object lens OL1 by using the position of the strong reflection signal in the image of the oblique plane 320. A relationship between the position of the strong reflection signal in the image of the oblique plane 320 and the distance between the object OBJ and the first object lens OL1 will be described below with reference to FIGS. 6 to 13.

Figure 6:
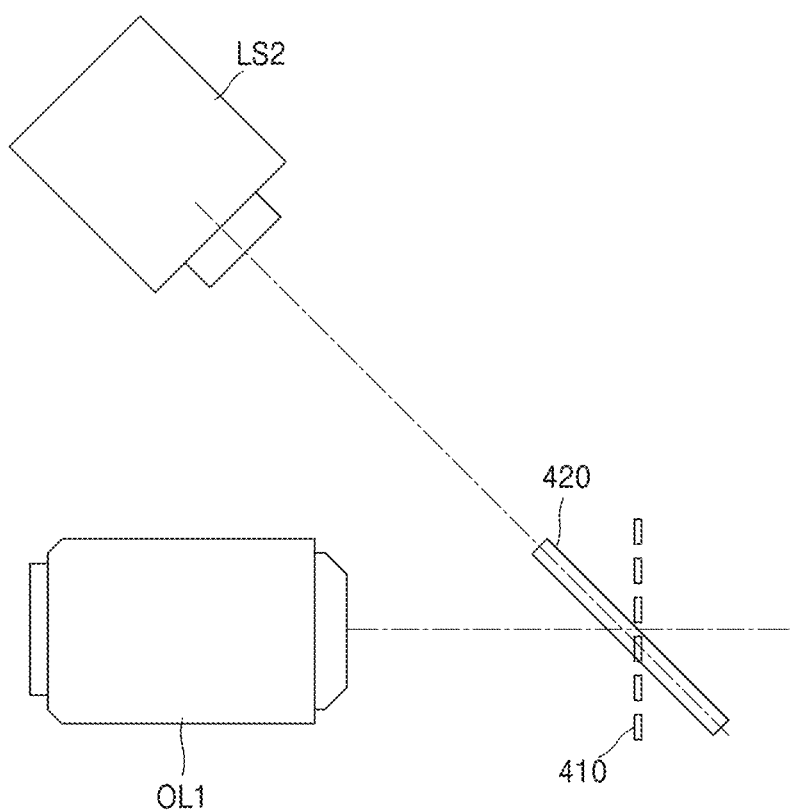
FIG. 6 is a diagram schematically showing an embodiment of a distance between an object and a first object lens.
Figure 7:
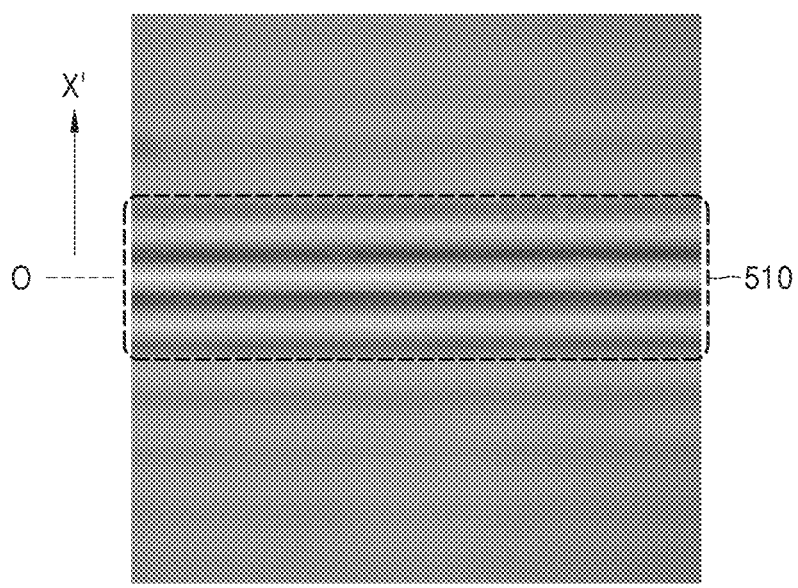
FIG. 7 is a diagram schematically showing an oblique plane image captured by a surface detecting unit according to the distance of FIG. 6 between the object and the first object lens.

FIG. 6 is a diagram schematically showing an embodiment of the distance between the object OBJ and the first object lens OL1, and FIG. 7 is a diagram schematically showing an image captured by the surface detecting unit 130 according to the distance of FIG. 6 between the object OBJ and the first object lens OL1.

As shown in FIG. 6, the focal position of the first object lens OL1 and an irradiating direction 420 of light irradiated from the second light source LS2 may be the same on a focal plane 410 according to the optical axis of the first object lens OL1.

In this case, the second light detector CAM2 of the surface detecting unit 130 may capture an image in which the region of interest and an area where a reflection signal is strong, as shown in FIG. 7. A difference between the focal position of the first object lens OL1 and the irradiating direction 420 of the light may be defined as a position that is out of focus. When the difference between the focal position of the first object lens OL1 and the irradiating direction 420 of the light is a reference value or less among the focal plane 410, a strong reflection signal area 510 in an oblique plane image captured as in FIG. 7 may be referred to as an in-image region of interest corresponding area. An in-image region of interest corresponding area 0 may be positioned at, for example, a center point that bisects the total number of pixels in a fourth direction (X' direction) of the oblique plane image.

An image captured when the difference between the focal position of the first object lens OL1 and the irradiating direction 420 of the light is the reference value or less among the focal plane 410 may be referred to as an image in focus. An image captured when the difference between the focal position of the first object lens OL1 and the irradiating direction 420 of the light is more than the reference value among the focal plane 410 may be referred to as an image out of focus.

Figure 8:
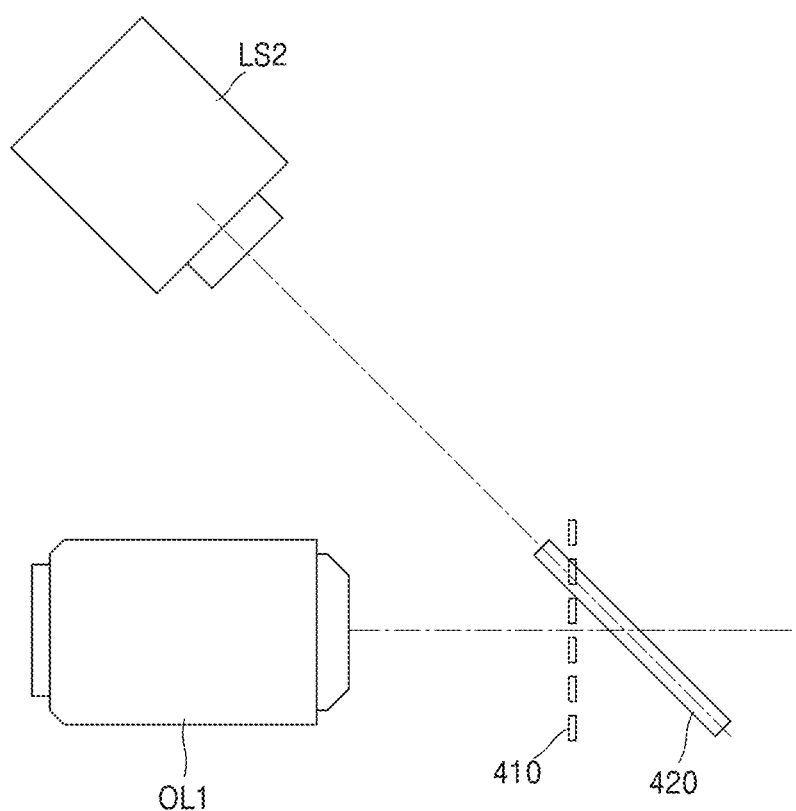
FIG. 8 is a diagram schematically showing another embodiment of a distance between an object and a first object lens.
Figure 9:
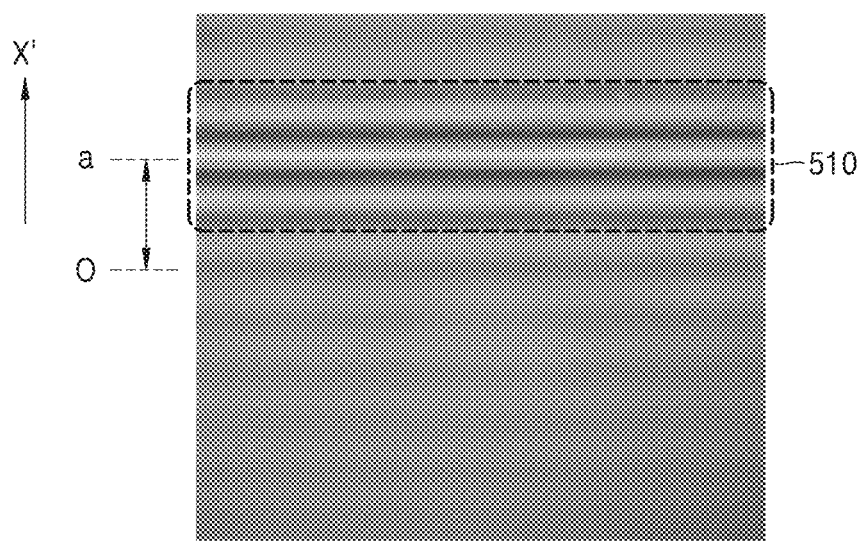
FIG. 9 is a diagram schematically showing an oblique plane image captured by a surface detecting unit according to the distance of FIG. 8 between the object and the first object lens.

FIG. 8 is a diagram schematically showing another embodiment of the distance between the object OBJ and the first object lens OL1, and FIG. 9 is a diagram schematically showing an image captured by the surface detecting unit 130 according to the distance of FIG. 8 between the object OBJ and the first object lens OL1.

As shown in FIG. 8, the focal position of the first object lens OL1 may be closer to the focal plane 410 according to the optical axis of the first object lens OL1 than the irradiating direction 420 of the light to the focal plane 410.

In this case, as shown in FIG. 9, the region of interest and a focal area may be separated. In this case, as shown in FIG. 9, the strong reflection signal area 510 may be positioned above the in-image region of interest corresponding area 0 in the fourth direction (X' direction) in the image.

Figure 10:
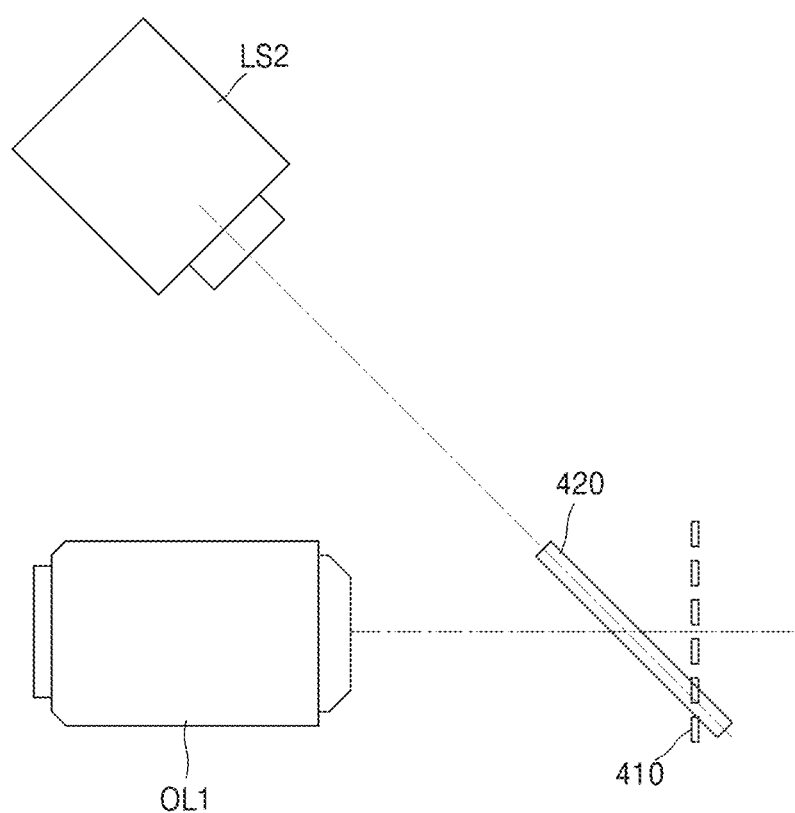
FIG. 10 is a diagram schematically showing another embodiment of a distance between an object and a first object lens.
Figure 11:
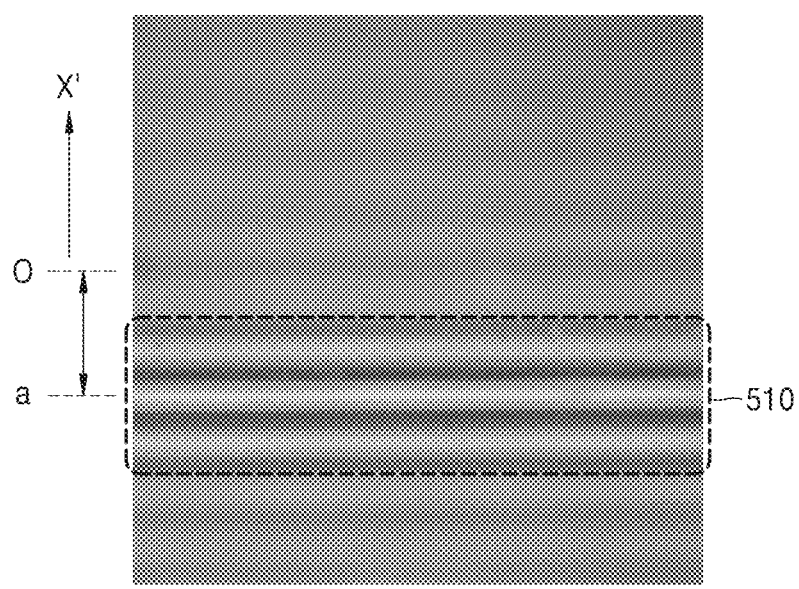
FIG. 11 is a diagram schematically showing an oblique plane image captured by a surface detecting unit according to the distance of FIG. 10 between the object and the first object lens.

FIG. 10 is a diagram schematically showing another embodiment of the distance between the object OBJ and the first object lens OL1, and FIG. 11 is a diagram schematically showing an oblique plane image captured by the surface detecting unit 130 according to the distance of FIG. 8 between the object OBJ and the first object lens OL1.

As shown in FIG. 10, the focal position of the first object lens OL1 may be farther from the focal plane 410 of the first object lens OL1 than the irradiating direction 420 of the light from the focal plane 410.

In this case, as shown in FIG. 11, the strong reflection signal area 510 may be positioned below the in-image region of interest corresponding area 0 in the fourth direction (X' direction) in the image.

The processor 110 may obtain a distance from which focus of the first object lens OL1 deviates from the object OBJ as below, by using a relationship between movement of a strong reflection signal area and the distance between the first object lens OL1 and the surface of the object OBJ, described with reference to FIGS. 6 to 11. A method of calculating the distance between the object OBJ and the first object lens OL1 will be described below with reference to FIGS. 12 and 13.

Figure 12:
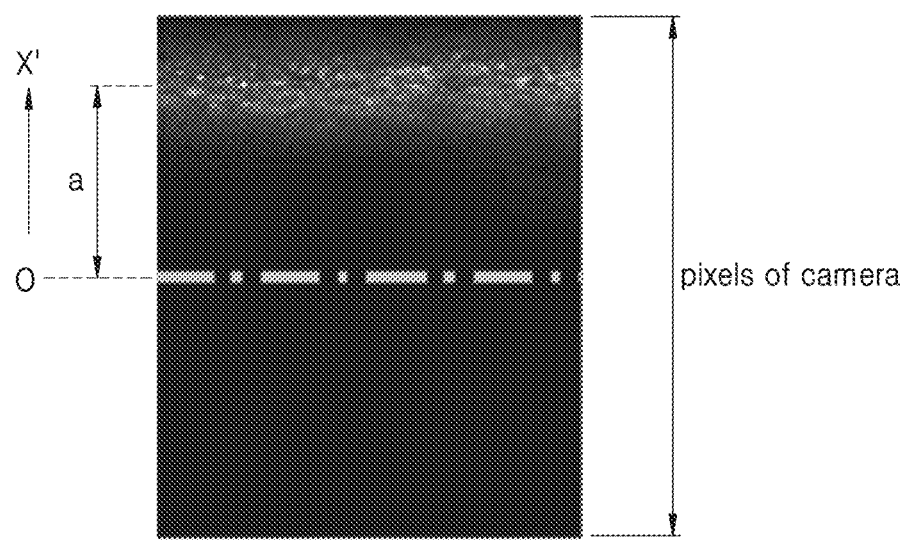
FIGS. 12 and 13 are diagrams for describing a method of calculating a distance between an object and a first object lens.
Figure 13:
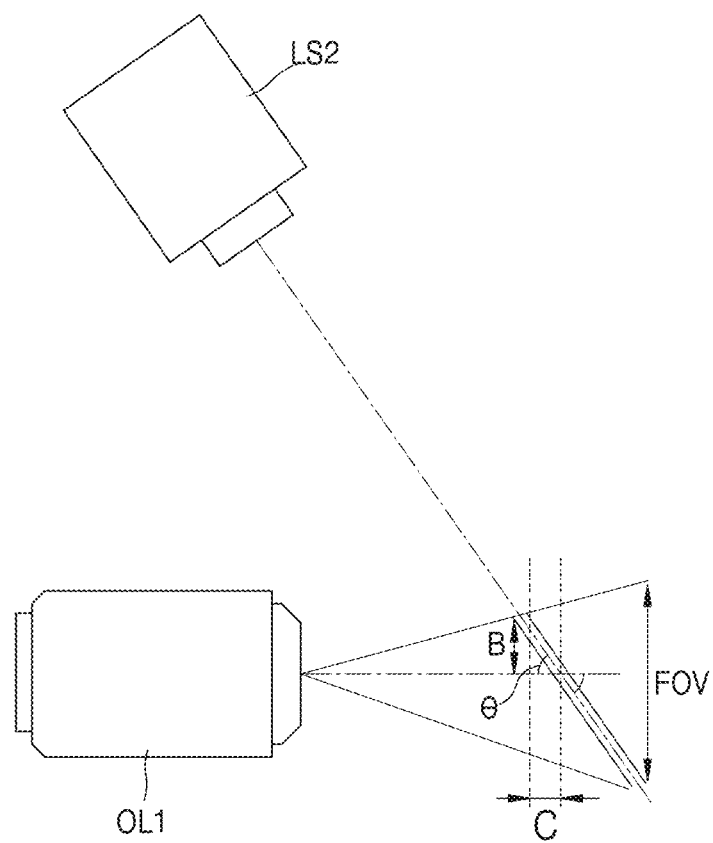

FIGS. 12 and 13 are diagrams for describing the method of calculating the distance between the object OBJ and the first object lens OL1.

First, the processor 110 may obtain an oblique plane image captured by the surface detecting unit 130 as shown in FIG. 12. The processor 110 may obtain the total number of pixels (pixels of camera) of the oblique plane image in the fourth direction (X'-axis) and a distance between an in-image region of interest corresponding area and a strong reflection signal area in the fourth direction (X'-axis) of the strong reflection signal area in the oblique plane image (or the number of pixels a between the strong reflection signal area and a region of interest). The processor 110 may obtain an out-of-focus position b according to Equation 1 below. In Equation 1 below, FOV (field of view) may denote an angle of view of the first object lens OL1 (or the second light detector CAM2) shown in FIG. 13, pixels of camera may denote the total number of pixels of the oblique plane image of FIG. 12 in the fourth direction (X'-axis), a may denote the number of pixels between the in-image region of interest corresponding area and the strong reflection signal area in the fourth direction (X'-axis) in the oblique plane image of FIG. 12, and b may denote the out-of-focus position in FIG. 13.

$$b = a \times \frac{FOV}{\text{pixels of camera}} \quad \text{[Equation 1]}$$

A relationship between a distance c in which focus of the first object lens OL1 out of an object and an angle $\theta$ formed by an optical axis of the second light source LS2 and an optical axis of the first object lens OL1 may be represented by Equation 2 below. Here, the angle $\theta$ formed by the optical axis of the second light source LS2 and the optical axis of the first object lens OL1 may be the same as the angle $\theta$ formed by the optical axis of the second light source LS2 and the optical axis of the first object lens OL1 in FIGS. 3A and 13.

$$c = b \times \tan\left(\frac{\pi}{2} - \theta\right) \quad \text{[Equation 2]}$$

Accordingly, the distance c in which the focus of the first object lens OL1 is out of the object may be calculated according to Equation 3 below. The distance c in which the focus of the first object lens OL1 is out of the object may be proportional to the number of pixels a between the in-image region of interest corresponding area and the strong reflection signal area in the fourth direction (X'-axis) in the oblique plane image. The distance c in which the focus of the first object lens OL1 is out of the object lens may be proportional to FOV. The distance c in which the focus of the first object lens OL1 is out of the object lens may be proportional to pixels of camera. The distance c in which the focus of the first object lens OL1 is out of the object may be proportional to a value of $$\tan\left(\frac{\pi}{2} - \theta\right).$$

$$c = a \times \frac{FOV}{\text{pixels of camera}} \times \tan\left(\frac{\pi}{2} - \theta\right) \quad \text{[Equation 3]}$$

$$\tan\left(\frac{\pi}{2} - \theta\right)$$

Here, FOV, pixels of camera, and the value of may be values (constants) pre-determined according to system settings of an oblique plane microscopy. A constant K may be pre-determined according to Equation 4 below.

$$K = \frac{FOV}{\text{pixels of camera}} \times \tan\left(\frac{\pi}{2} - \theta\right) \quad \text{[Equation 4]}$$

Accordingly, the distance c in which the focus of the first object lens OL1 is out of the object may be obtained according to Equation 5 below through the pre-determined constant K and the number of pixels a in which a position of a strong reflection signal deviates from an image obtained by the oblique plane microscopy.

$$c = a \times K \quad \text{[Equation 5]}$$

Also, a distance between the first object lens OL1 and the object may be obtained by adding a focal length of the first object lens OL1 and the distance c in which the focus of the first object lens OL1 is out of the object.

The distance c in which the focus of the first object lens OL1 is out of the object may be obtained through an image captured by the second light detector CAM2 of the surface detecting unit 130 while the first light detector CAM1 of the image capturing unit 120 captures an image of the object. The actuator 140 of the photographing apparatus 100 including the surface detecting unit 130 may adjust the distance between the first object lens OL1 and the object when the distance c in which the focus of the first object lens OL1 is out of the object is a pre-determined value or more.

Alternatively, the distance between the first object lens OL1 and the object may be obtained through the image captured by the second light detector CAM2 of the surface detecting unit 130 while the first light detector CAM1 of the image capturing unit 120 captures the image of the object, and the actuator 140 of the photographing apparatus 100 including the surface detecting unit 130 may adjust the distance between the first object lens OL1 and the object when the distance between the first object lens OL1 and the object is a pre-determined value or more.

Figure 14:
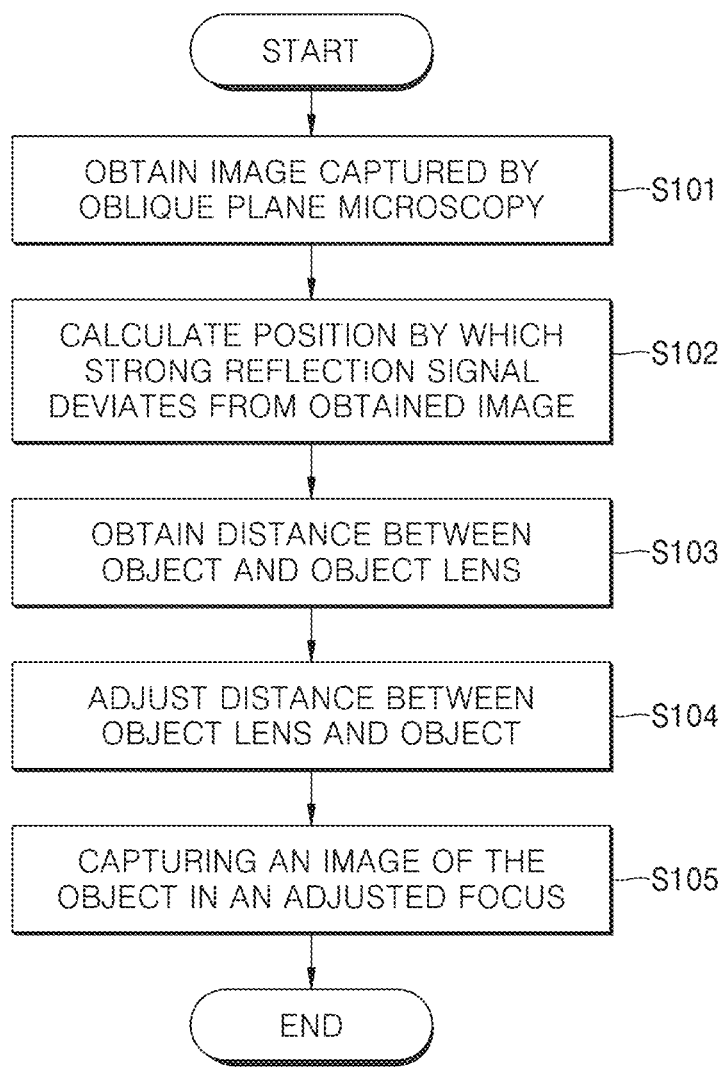
FIG. 14 is a flowchart schematically illustrating an embodiment of a photographing method.

FIG. 14 is a flowchart schematically illustrating an embodiment of a photographing method. Hereinafter, an object lens may denote the first object lens OL1 of FIGS. 1 to 3B.

Referring to FIG. 14, the photographing method may include obtaining an oblique plane image captured by a surface detecting unit (operation S101), obtaining a position of a strong reflection signal from the captured image (operation S102), obtaining a distance between an object and an object lens (or a distance in which focus of the object lens is out of the object) by using the position of the strong reflection signal in the captured image (operation S103), adjusting the distance between the object lens and the object (operation S104), and capturing, by a photographing apparatus including the surface detecting unit, an image of the object in focus from the adjusted distance (operation S105). Here, the obtaining of the position of the strong reflection signal from the captured image (operation S102) and the obtaining of the distance between the object and the object lens (or the distance in which the focus of the object lens is out of the object) by using the position of the strong reflection signal in the captured image (operation S103) may be performed according to a method described with reference to FIGS. 1 to 13.

FIG. 15 is a flowchart schematically illustrating another embodiment of a photographing method performed by a photographing apparatus including a surface detecting unit. Hereinafter, an object lens may denote the first object lens OL1 of FIGS. 1 to 3B.

Referring to FIG. 15, the photographing method may include obtaining an oblique plane image captured by the surface detecting unit (operation S201), obtaining a position of a strong reflection signal from the captured image (operation S202), obtaining and storing a distance between an object lens and an object corresponding to the position of the strong reflection signal in the captured image (operation S203), obtaining an image captured by an oblique plane microscopy in real time (operation S204), obtaining a position of the strong reflection signal in the obtained image in real time (operation S205), obtaining a distance between the object lens and the object in real time from the image obtained in real time, by using a distance between the object lens and the object corresponding to a pre-stored position by which the strong reflection signal deviates (operation S206), adjusting the distance between the object lens and the object (operation S207), and capturing an image of the object in focus from the adjusted distance (operation S208). After the capturing of the image of the object in focus from the adjusted distance (operation S208), the obtaining of the image captured by the surface detecting unit in real time (operation S204), the obtaining of the position of the strong reflection signal in the obtained image in real time (operation S205), the obtaining of the distance between the object lens and the object corresponding to the obtained position in real time (operation S206), the adjusting of the distance between the object lens and the object (operation S207), and the capturing of the image of the object in focus from the adjusted distance (operation S208) may be repeatedly performed. Here, the obtaining of the position of the strong reflection signal from the captured image (operation S202), and the obtaining and storing of the distance between the object lens and the object corresponding to the position of the strong reflection signal in the captured image (operation S203) may be performed according to a method described with reference to FIGS. 1 to 13.

According to a photographing apparatus and a photographing method, a surface of an object having many curves may be tracked in real time by obtaining a change in an area in focus according to a change in a distance between an object lens and the object in an image captured by a surface detecting unit. The photographing method and the photographing apparatus including the surface detecting unit may be used to, for example, efficiently, accurately, and non-invasively examine human conjunctiva, in particular, conjunctival goblet cells.

According to a photographing apparatus and a photographing method, a surface of an object having many curves, such as human conjunctiva, may be detected by using an oblique plane image.

Also, according to the photographing apparatus and the photographing method, a distance between the photographing apparatus and an object may be calculated by using an oblique plane image and the distance between the photographing apparatus and the object may be adjusted.

In addition, according to the photographing apparatus and the photographing method, a high depth of focus image may be captured at a distance adjusted by using an oblique plane image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A photographing apparatus comprising:
an image capturing unit comprising a first light source, an object lens, and a first light detector, and configured such that first light irradiated by the first light source is reflected by an object or realizes fluorescent light through excitation, the first light detector receives the fluorescent light or the first light reflected by the object and captures a high depth of focus image including a region of interest of the object;
a surface detecting unit comprising a second light source, the object lens, and a second light detector, and configured such that second light irradiated by the second light source is incident on a surface of the object at an angle with an optical axis of the object lens, the second light detector receives the second light reflected by the surface of the object and captures an oblique plane image;
a processor configured to obtain a strong reflection signal area where a reflection signal is strong in the oblique plane image obtained from the second light detector, and obtain a relative position relationship between the region of interest and a focal plane of the object lens; and
an actuator configured to adjust the region of interest to be in focus.

2. The photographing apparatus of claim 1, wherein the processor is further configured to obtain a number of pixels between the strong reflection signal area and an in-image region of interest corresponding area in the oblique plane image obtained from the second light detector.

3. The photographing apparatus of claim 1, wherein the processor is further configured to obtain the relative position relationship between the region of interest and the focal plane of the object lens by using a number of pixels in a first direction between the strong reflection signal area and an in-image region of interest corresponding area in the oblique plane image obtained from the second light detector.

4. The photographing apparatus of claim 1, wherein the processor is further configured to obtain the relative position relationship between the region of interest and the focal plane of the object lens by using a number of pixels in a first direction between the strong reflection signal area and an in-image region of interest corresponding area in the oblique plane image obtained from the second light detector, and a total number of pixels in the first direction of the oblique plane image.

5. The photographing apparatus of claim 1, wherein the processor is further configured to obtain the relative position relationship between the region of interest and the focal plane of the object lens by using at least one of a number of pixels in a first direction between the strong reflection signal area and an in-image region of interest corresponding area in the oblique plane image obtained from the second light detector, a total number of pixels in the first direction of the oblique plane image, an angle of view of the object lens, and an angle formed by the first light source incident on the object and the optical axis of the object lens.

6. The photographing apparatus of claim 1, wherein a wavelength band of the first light and a wavelength band of the second light are different from each other.

7. The photographing apparatus of claim 1, wherein the first light source comprises a light-emitting diode (LED) light source and the second light source comprises a laser diode (LD) light source.

8. The photographing apparatus of claim 1, wherein a wavelength band of the first light is about 300 nm to about 450 nm, and a wavelength band of the second light is about 600 nm to about 800 nm.

9. The photographing apparatus of claim 1, wherein the image capturing unit further comprises an exciter filter arranged on an optical path of the first light and selectively transmitting light in a wavelength band exciting a fluorescent material.

10. The photographing apparatus of claim 1, wherein the image capturing unit further comprises an emission filter arranged on an optical path of the first light and selectively transmitting light in a wavelength band emitted by a fluorescent material.

11. The photographing apparatus of claim 1, wherein the surface detecting unit further comprises an emission filter arranged on an optical path of the second light and selectively transmitting light in a wavelength band emitted by a fluorescent material.

12. The photographing apparatus of claim 1, wherein the image capturing unit further comprises a variable lens arranged on an optical path and adjusting a focal position of the object lens.

13. The photographing apparatus of claim 12, wherein the variable lens comprises an electrically tunable lens.

14. A photographing method comprising:
capturing, by an image capturing unit comprising a first light source, an object lens, and a first light detector, a high depth of focus image including a region of interest of an object;
obtaining, by a surface detecting unit comprising a second light source, a second light detector, and the object lens, an oblique plane image;
obtaining, a strong reflection signal area where a reflection signal is strong in the oblique plane image, and obtaining a relative position relationship between the region of interest and a focal plane of the object lens;
adjusting the region of interest to be in focus; and
capturing an image of the object in an adjusted focus.

15. The photographing method of claim 14, wherein the obtaining of the relative position relationship between the region of interest and the focal plane comprises
obtaining the relative position relationship between the region of interest and the focal plane of the object lens by using at least one of a number of pixels in a first direction between the strong reflection signal area and an in-image region of interest corresponding area in the oblique plane image obtained from the second light detector, a total number of pixels in the first direction of the second light detector, an angle of view of the object lens, and an angle formed by the first light source incident on the object and the optical axis of the object lens.

16. The photographing method of claim 14, wherein a wavelength band of first light irradiated from the first light source and a wavelength band of second light irradiated from the second light source are different from each other.

17. The photographing method of claim 14, wherein a wavelength band of first light irradiated from the first light source is about 300 nm to about 450 nm, and a wavelength band of second light irradiated from the second light source is about 600 nm to about 800 nm.

18. The photographing method of claim 14, wherein the adjusting of the region of interest to be in focus comprises, when the relative position relationship between the region of interest and the focal plane of the object lens is a pre-determined reference value or more, adjusting, by an actuator, the region of interest to be in focus, and when the relative position relationship between the region of interest and the focal plane of the object lens is less than the pre-determined reference value, adjusting, by a variable lens, the region of interest to be in focus.

* * * * *